US012117156B2

(12) United States Patent
Simkins et al.

(10) Patent No.: US 12,117,156 B2
(45) Date of Patent: Oct. 15, 2024

(54) ATTACHABLE BATTERY-POWERED LIGHT ASSEMBLY FOR ILLUMINATING A BOTTLE AND METHOD FOR ILLUMINATING A BOTTLE WITH A LIGHT ASSEMBLY

(71) Applicant: MAKE IT BETTER LLC, Miami Beach, FL (US)

(72) Inventors: Nicole Mara Simkins, Miami Beach, FL (US); Jarrett Levin, Miramar, FL (US)

(73) Assignee: MAKE IT BETTER LLC, Miami Beach, FL (US)

( * ) Notice: Subject to any disclaimer, the term of this patent is extended or adjusted under 35 U.S.C. 154(b) by 0 days.

(21) Appl. No.: 18/325,972

(22) Filed: May 30, 2023

(65) Prior Publication Data

US 2023/0383940 A1 Nov. 30, 2023

Related U.S. Application Data

(60) Provisional application No. 63/365,469, filed on May 27, 2022.

(51) Int. Cl.
*F21V 33/00* (2006.01)
*A47G 19/22* (2006.01)
(Continued)

(52) U.S. Cl.
CPC ...... *F21V 33/0036* (2013.01); *A47G 23/0309* (2013.01); *F21S 9/02* (2013.01);
(Continued)

(58) Field of Classification Search
CPC ........ A47G 23/0309; A47G 2019/2238; A47G 2019/2244; A47G 19/2227
(Continued)

(56) References Cited

U.S. PATENT DOCUMENTS 2,745,947 A 5/1956 Leon
3,017,051 A 1/1961 Rosenfeld
(Continued)

FOREIGN PATENT DOCUMENTS

AU 2003257383 A8 2/2004
CA 2979645 A1 9/2016
(Continued)

OTHER PUBLICATIONS

Ifolaina Led Light Base Multicolor Round Show Stand Display Plate for 3D Crystal Glass Art with Sensitive Touch Switch.
(Continued)

*Primary Examiner* — William N Harris
(74) *Attorney, Agent, or Firm* — Pearson IP; Loren Donald Pearson

(57) ABSTRACT

A battery-powered light can be installed in a punt of a bottle during manufacture and then turned on at use. The battery-powered light includes a skid pad that is free of adhesive. A battery insulator pull tab overlies the skid pad and can be removed even after adhering the light assembly to the bottle. The battery insulator pull tab prevents the battery of the light assembly from discharging before being needed. The skid pad prevents adhesive from sticking to the insulator pull tab, thereby making it otherwise unremovable.

11 Claims, 4 Drawing Sheets

(51) Int. Cl.
*A47G 23/03* (2006.01)
*F21S 9/02* (2006.01)
*F21V 21/08* (2006.01)
*F21V 23/00* (2015.01)
*F21Y 115/10* (2016.01)

(52) U.S. Cl.
CPC ........ *F21V 21/0808* (2013.01); *F21V 23/005* (2013.01); *A47G 2019/2238* (2013.01); *F21Y 2115/10* (2016.08)

(58) Field of Classification Search
USPC .......................................................... 362/101
See application file for complete search history.

(56) References Cited

U.S. PATENT DOCUMENTS

| | | | | |
|---|---|---|---|---|
| 3,137,956 | A | 6/1964 | Morgan | |
| 3,378,680 | A | 4/1968 | Moxley | |
| 4,261,026 | A | 4/1981 | Bolha | |
| 4,336,574 | A | 6/1982 | Goodman | |
| 4,344,113 | A | 8/1982 | Ditto | |
| 4,858,084 | A | 8/1989 | Sheryll | |
| 5,010,461 | A | 4/1991 | Saotome | |
| 5,307,250 | A | 4/1994 | Pearson | |
| 5,784,265 | A | 7/1998 | Chen | |
| 5,990,790 | A | 11/1999 | Lusareta | |
| 6,082,866 | A | 7/2000 | Amedee | |
| 6,164,793 | A | 12/2000 | Wu | |
| 6,254,247 | B1 * | 7/2001 | Carson | G03H 1/22 362/101 |
| 6,354,711 | B1 | 3/2002 | McCoy | |
| 6,371,624 | B1 | 4/2002 | Dorney | |
| 6,379,018 | B1 | 4/2002 | Rycroft | |
| 6,419,384 | B1 * | 7/2002 | Lewis | A01K 7/00 362/802 |
| 6,648,498 | B1 | 11/2003 | Tsao | |
| 6,786,614 | B2 | 9/2004 | Ciarrocchi | |
| 6,793,363 | B2 | 9/2004 | Jensen | |
| 6,796,670 | B2 | 9/2004 | Winters | |
| 6,863,415 | B2 | 3/2005 | Lu | |
| 6,896,387 | B2 | 5/2005 | Renfro | |
| 7,175,294 | B1 | 2/2007 | Estrada et al. | |
| 7,175,306 | B2 | 2/2007 | Pan | |
| 7,204,614 | B2 | 4/2007 | Hanis | |
| 7,258,458 | B2 | 8/2007 | Mochiachvili | |
| 7,390,104 | B2 | 6/2008 | Coushaine | |
| 7,401,935 | B2 | 7/2008 | Vanderschuit | |
| 7,419,072 | B1 | 9/2008 | Vanella | |
| 7,723,899 | B2 | 5/2010 | Blandino et al. | |
| 7,976,177 | B2 | 7/2011 | Dikopf | |
| 8,087,809 | B2 | 1/2012 | Tikhman et al. | |
| 8,322,875 | B2 | 12/2012 | Brinson | |
| 8,459,821 | B1 | 6/2013 | Fusilier | |
| 9,052,105 | B2 | 6/2015 | Zalon | |
| 9,140,443 | B1 | 9/2015 | Galvez | |
| 9,182,090 | B2 | 11/2015 | Muehlemann | |
| 9,186,005 | B1 | 11/2015 | Ferrier | |
| 9,432,758 | B1 | 8/2016 | Kirk | |
| 9,538,874 | B2 | 1/2017 | Salter | |
| 9,743,787 | B2 | 8/2017 | Godinez | |
| 10,058,204 | B2 | 8/2018 | Kuo | |
| 10,234,131 | B2 | 3/2019 | Lee | |
| 10,295,400 | B2 | 5/2019 | Wallace | |
| 10,641,476 | B2 | 5/2020 | Maxik et al. | |
| 11,060,714 | B2 | 7/2021 | Mattice | |
| 2003/0076672 | A1 | 4/2003 | Head | |
| 2004/0125594 | A1 | 7/2004 | Wu | |
| 2004/0264300 | A1 | 12/2004 | Gratkowski | |
| 2005/0013129 | A1 | 1/2005 | Zhang | |
| 2006/0097121 | A1 | 5/2006 | Fugate | |
| 2006/0109644 | A1 | 5/2006 | Saucier | |
| 2007/0121317 | A1 | 5/2007 | Huang | |
| 2008/0099650 | A1 | 5/2008 | Sax | |
| 2009/0034245 | A1 | 2/2009 | Esses | |
| 2010/0157579 | A1 * | 6/2010 | Kononuk | A47G 23/0309 362/101 |
| 2011/0096532 | A1 * | 4/2011 | Brinson | A47G 19/2227 362/101 |
| 2011/0188237 | A1 * | 8/2011 | Griffiths | B65D 23/12 362/382 |
| 2012/0106130 | A1 | 5/2012 | Beaudette | |
| 2012/0273372 | A1 | 11/2012 | Goldburt | |
| 2014/0233215 | A1 | 8/2014 | Cooper | |
| 2014/0300273 | A1 | 10/2014 | Lebrun et al. | |
| 2014/0317934 | A1 | 10/2014 | Kramer | |
| 2017/0318996 | A1 | 11/2017 | Godinez | |
| 2017/0363259 | A1 | 12/2017 | Feng | |
| 2018/0310743 | A1 | 11/2018 | Abukar | |
| 2019/0023179 | A1 | 1/2019 | Porcs | |
| 2019/0184272 | A1 * | 6/2019 | Cunningham | A63B 63/08 |
| 2019/0216246 | A1 | 7/2019 | Güvenc | |
| 2019/0353339 | A1 | 11/2019 | Ige | |
| 2019/0357715 | A1 | 11/2019 | Huntley | |
| 2020/0077821 | A1 | 3/2020 | Santiago | |
| 2021/0300746 | A1 | 9/2021 | Honkawa | |

FOREIGN PATENT DOCUMENTS

| | | | |
|---|---|---|---|
| EP | 2441357 | A1 | 4/2012 |
| EP | 2662304 | B1 | 7/2016 |
| EP | 3305594 | A1 | 1/2019 |
| GB | 751756 | | 7/1956 |
| GB | 2363838 | | 1/2002 |
| GB | 2410487 | | 8/2005 |
| GB | 2422288 | | 7/2006 |
| GB | 2474284 | | 4/2011 |
| GB | 2553109 | | 2/2020 |
| WO | 1994023622 | A1 | 10/1994 |
| WO | 2001074204 | A2 | 10/2001 |
| WO | 2004006735 | A1 | 1/2004 |
| WO | 2012087885 | A2 | 6/2012 |
| WO | 2016007464 | A1 | 1/2016 |
| WO | 2016135504 | A1 | 9/2016 |
| WO | 2018087373 | A1 | 5/2018 |
| WO | 2019196772 | A1 | 10/2019 |
| WO | 2020143876 | A1 | 7/2020 |
| WO | 2021151924 | A1 | 8/2021 |
| WO | 2021179024 | A1 | 9/2021 |

OTHER PUBLICATIONS

Loguide LED Coaster.
Milk Bottle LED Lights Arduino Controlled clock.
White Light Up LED Bottle Base Up light.

* cited by examiner

ATTACHABLE BATTERY-POWERED LIGHT ASSEMBLY FOR ILLUMINATING A BOTTLE AND METHOD FOR ILLUMINATING A BOTTLE WITH A LIGHT ASSEMBLY

CROSS-REFERENCE TO RELATED APPLICATIONS

This application claims the benefit of U.S. Provisional Application No. 63/365,469, filed May 27, 2022, which is hereby incorporated by reference.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

The invention relates to devices and methods for illuminating vessels, in particular bottles, for holding liquids.

Description of the Related Art

Battery powered devices such as electrical lights are shipped with a removable plastic strip to prevent parasitic voltages from depleting the batteries. The removable plastic strip can be referred to as a “battery insulator”, a “pull tab”, or a “battery insulator pull tab”. A battery insulator tab prevents a battery from being discharged by parasitic battery drain even when a light circuit is disconnected with the switch.

Electrical lights have been adhered to a punt of a bottle to produce an illuminated bottle. The illuminated bottle is attractive looking. In a dark environment, like a nightclub, an illuminated bottle is particularly attractive. In addition, servers in a nightclub can more easily observe whether a patron’s bottle is empty while it is illuminated.

Presently, servers, bartenders, and brand promoters purchase a circuit board with battery-powered LEDs. At the time of consumption, the server turns on the LEDs by activing a switch at the center of the circuit board and tapes the circuit board with the LED facing upward, in the punt of the bottle. The server turns on the light by inserting batteries, switching an on/off switch, or removing a battery insulator pull tab. Once the circuit board is adhered to the punt of the bottle, the light cannot be turned off because the batteries and switch are located on the top of the circuit board.

To adhere the circuit board to the punt, a piece of adhesive tape that is larger than the circuit board is adhered to the back (i.e., the face opposite the LEDs) of the circuit board. Then the tape is adhered to the punt of the bottle. The tape surrounds the periphery of the circuit board so the LEDs, batteries, and switches on the top of the circuit board cannot be accessed.

If a bottle is filled at the factory and a circuit board light is turned on and attached to the punt of the bottle by the factory, the batteries will be dead by the time a consumer buys the bottle.

If a bottle manufacturer adheres a battery-powered light in the punt of the bottle and includes a battery insulator pull tab, the adhesive around the perimeter of the light will adhere to the pull tab as well. The adhesive prevents the pull tab from being removed. The pull tab will typically snap before the adhesive fails.

Accordingly, a need exists to create an illuminated bottle with a light attached at the factory that can be turned on when needed by the retailer or purchaser.

BRIEF SUMMARY OF THE INVENTION

An object of the invention is to provide an attachable battery-powered light assembly for illuminating a bottle that overcomes the disadvantages of the devices of this general type and of the prior art.

With the foregoing and other objects in view there is provided, in accordance with the invention, a light assembly for illuminating a bottle. The light assembly also includes an electrical light for illuminating a bottle. The electrical light has a light anode and a light cathode. A backing has a backing perimeter and a backing top. The backing top supports the electrical light. A battery has at least one battery electrode; a battery typically has a battery cathode and a battery anode. The battery is supported by the backing. An anode battery contact is used for connecting to the battery anode. A cathode battery contact connects to the battery cathode. An anode lead interconnects the anode battery contact and the light anode. A cathode lead interconnects the cathode battery contact and the light cathode. A circuit is created when electricity flows from the battery anode to the anode battery contact to the anode lead to the light anode to the light cathode to the cathode lead to the cathode battery contact to the battery cathode. An insulator strip can be interposed in the circuit at a break point to interrupt the circuit. Examples of suitable break points is the spring connection between the battery anode and the anode battery contact or between the battery cathode and the battery contact. An insulator strip is interposed between the battery cathode and the cathode battery contact, or the battery anode and the anode battery contact. The insulator strip is removable. When inserted, the insulator strip interrupts a circuit. When the circuit is interrupted, the electrical light is off, and the battery is not discharging electricity. When a user (e.g., manufacturer, wholesaler, retailer, or consumer) remove the insulator strip, the circuit can be completed. The battery can supply electricity to the electrical light to cause the electrical light to emit light. A switch can be interposed within the circuit to switch the electrical light on or off. The insulator strip has a strip width. Adhesive is used for adhering to a bottom of the bottle. The adhesive is disposed on the top of the backing. The backing has a skid pad running between the break point and the backing perimeter. The skid pad is free of the adhesive. The skid pad has a skid pad width greater than the strip width. The removable insulator strip overlies the skid pad. The removable insulator extends beyond the backing perimeter and remains removable when the backing is adhered to the bottle. Even when the light assembly is adhered to the bottle, the insulator strip can be removed by pulling it outwardly along the skid pad.

A further object of the invention is to provide a method for illuminating a bottle that overcomes the disadvantages of the devices of this general type and of the prior art. The first step of the method is providing a light assembly. The next step is adhering the light to a bottle. After adhering the light to the bottle, the next step is pulling the removable insulator strip to allow an electrical connection between the battery cathode and the cathode battery contact and between the battery anode and the anode battery contact.

The method further may include adhering the light to the bottle before delivering the bottle to a retailer; and pulling the removable strip before delivering the bottle to the retailer.

The method further may include adhering the light to the bottle before delivering the bottle to a retailer; and pulling the removable strip after delivering the bottle to the retailer.

The method further may include adhering the light to the bottle before delivering the bottle to a drinking establishment; and pulling the removable strip before delivering the bottle to the drinking establishment.

The method further may include adhering the light to the bottle before delivering the bottle to a drinking establishment; and pulling the removable strip after delivering the bottle to the drinking establishment.

The method further may include adhering the light to the bottle before drinking contents of the bottle; and pulling the removable strip before drinking all of the contents of the bottle.

Other features that are considered as characteristic for the invention are set forth in the appended claims.

Although the invention is illustrated and described herein as embodied in an attachable battery-powered light assembly for illuminating a bottle and a method for illuminating a bottle with a light assembly, the invention should not be limited to the details shown in those embodiments because various modifications and structural changes may be made without departing from the spirit of the invention while remaining within the scope and range of equivalents of the claims.

The construction and method of operation of the invention and additional objects and advantages of the invention is best understood from the following description of specific embodiments when read in connection with the accompanying drawings.

DETAILED DESCRIPTION OF THE INVENTION

Figure 4:
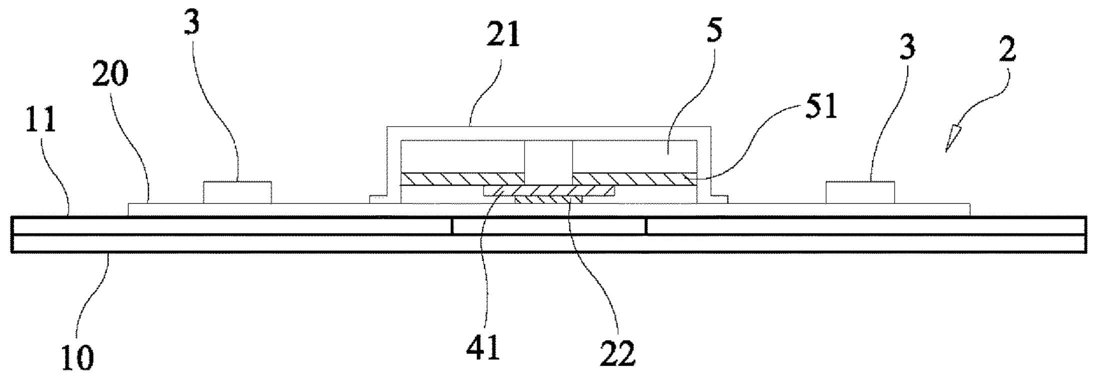
FIG. 4 is a front side sectional view of the light assembly shown in FIG. 1 taken along section line IV-IV in FIG. 1.
Figure 5:
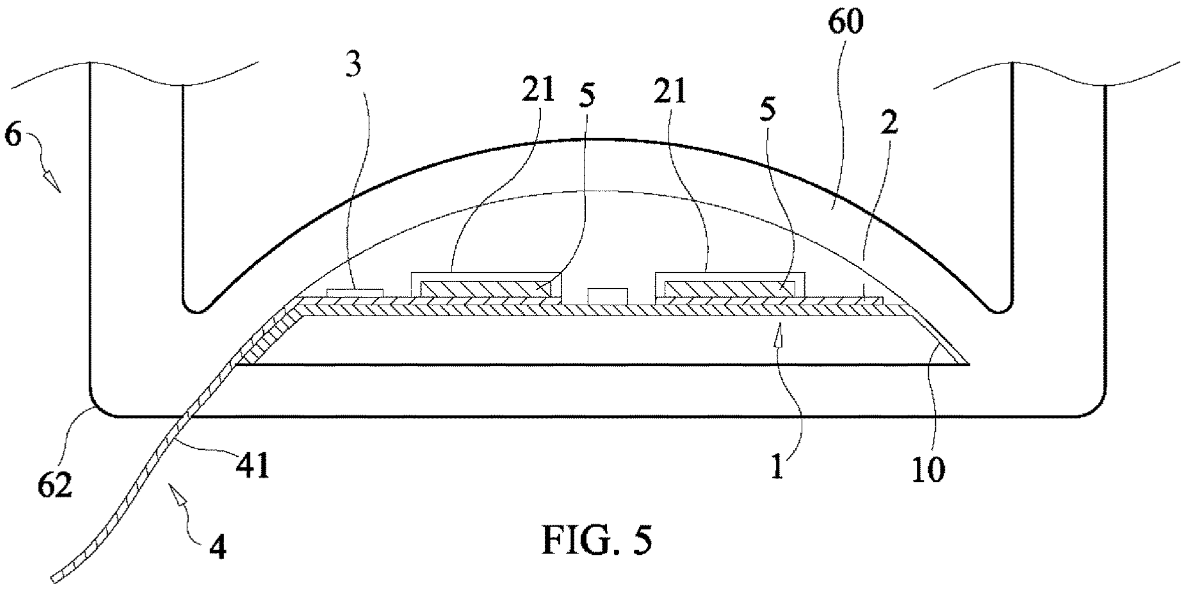
FIG. 5 is a front side section view of the light assembly attached to the bottle as shown in FIG. 5, but with the tab shown in its initial, inserted position.
Figure 6:
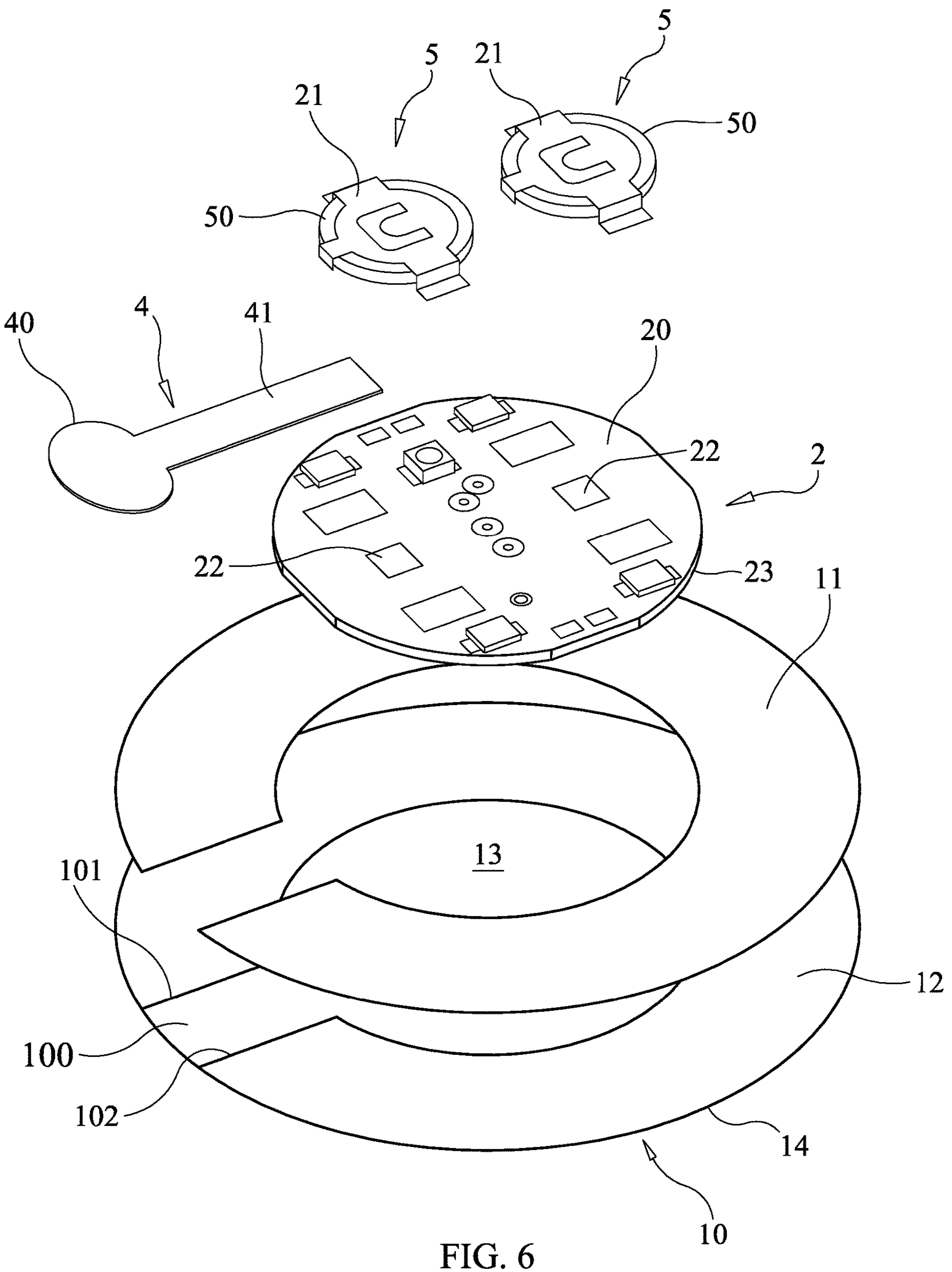
FIG. 6 shows a top front left exploded view of the light assembly shown in FIG. 1.

FIGS. 1-6 show a preferred embodiment of a light assembly 1. The light assembly 1 includes a backing 10 (which is shown in FIG. 6) made from a circular piece of cardboard. The backing 10 is preferably no wider than a bottom of a bottle 6. More preferably, the backing 10 is preferably no wider than a punt of the bottle 6. Adhesive 12 is disposed on a backing top 13 of the backing 10. A circuit board 2 is adhered to the backing top 13. The circuit board 2 has a circuit board top 20. The circuit board 2 has a narrower diameter than the backing 10. The circuit board 2 is disposed in the center of the backing 10. A skid pad 100 is an area on the backing top 13 that is free of adhesive 12. The skid pad 100 is smooth and the strip 41 can slide along the skid pad 100 without breaking. A preferred embodiment of the skid pad 100 is smooth cardboard. As shown in FIG. 6, the skid pad 100 has a right edge 101 and a left edge 102. A skid pad width $w_{100}$ of the skid pad 100 is defined between the right edge 101 and the left edge 102. The skid pad 100 runs from the backing perimeter 14 to a circuit board perimeter 23. A liner 11 is placed around the circuit board 2 and is removably adhered to the backing 10 with the adhesive 12. The liner 11 is preferably C-shaped. The liner 11 is preferably polyolefin coated paper. The liner 11 has a right edge 110 and a left edge 111. The right edge 110 of the liner 11 is aligned with the right edge 101 of the skid pad 100. The left edge 111 of the liner 11 is aligned with the left edge 102 of the skid pad 100.

The circuit board 2 has four light emitting diodes (also referred to as LEDs) 3 disposed on the circuit board top 20. When powered and switched on, LEDs 3 emit light. Batteries 5 are held on the circuit board top 20. Each battery 5 has a battery anode 50 on its top and a battery cathode 51 (FIG. 4). Examples of circuit electrodes include circuit anode 21 and circuit cathode 22. When operable, a respective circuit anode 21 contacts each battery anode 50; a respective circuit cathode 22 contacts each battery cathode 51. An LED anode 31 is electrically connected to the circuit anode 21. An LED cathode 32 is electrically connected to the circuit cathode 22. A switch 7 is disposed on the circuit board top 20. The switch 7 turns LEDs 3 on and off.

Figure 1:
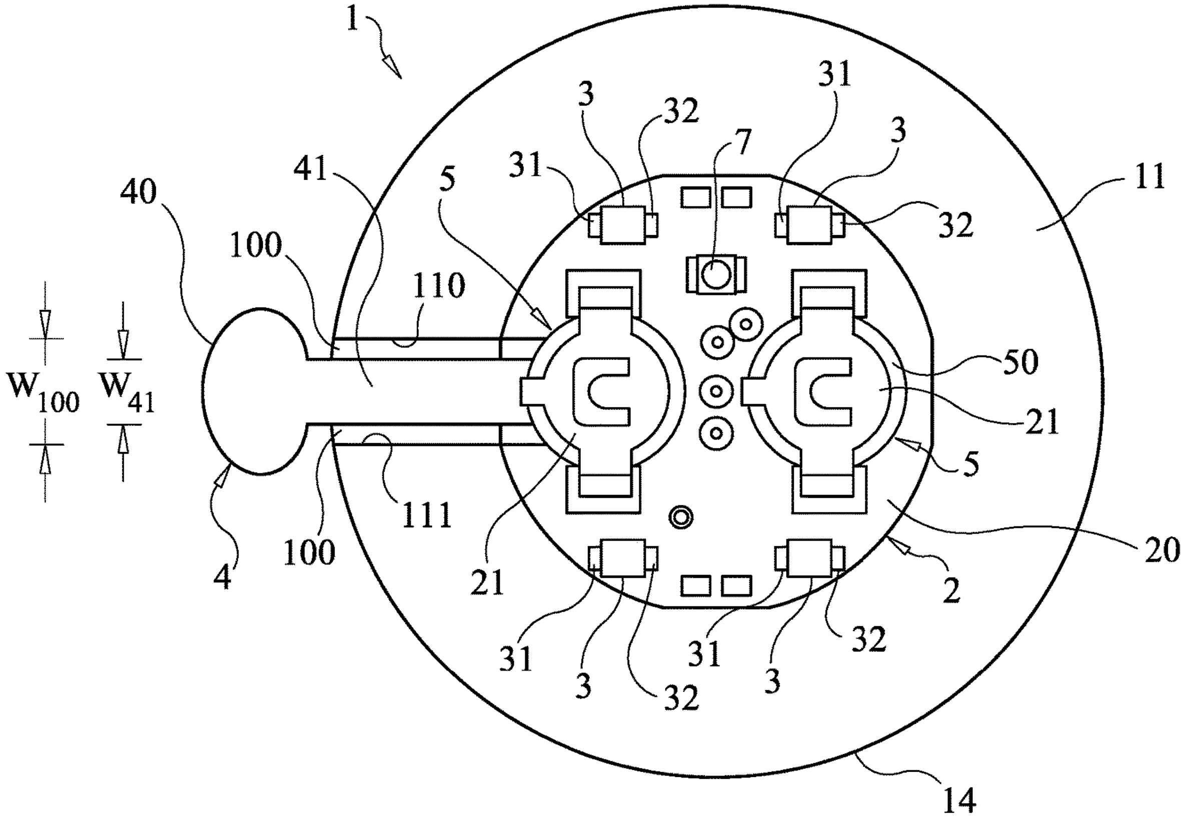
FIG. 1 is a diagrammatic plan view of a light assembly for bottles according to the invention.
Figure 2:
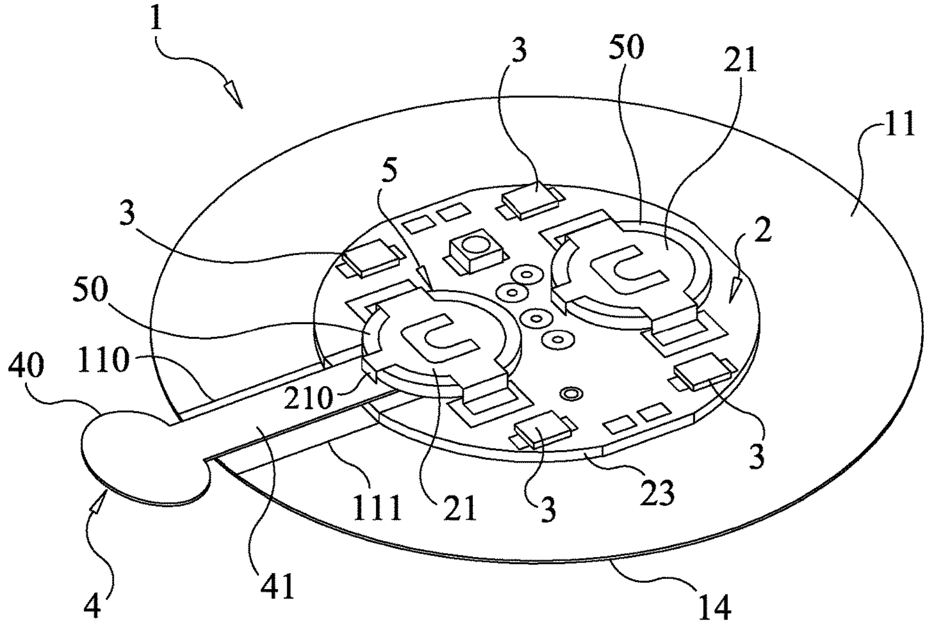
FIG. 2 is a top front left perspective view of the light assembly shown in FIG. 1.

FIGS. 1, 2, and 4 show details of an insulator tab 4. To prevent battery discharge, the insulator tab 4 is inserted between the battery cathode 51 and circuit cathode 22. The insulator tab 4 is made of an electrical insulator, preferably polypropylene. The insulator tab 4 has a grip 40 and a strip 41. The strip 41 has a width $w_{41}$ that is no wider than the width $w_{100}$ of the skid pad. The strip 41 overlies the skid pad 100 when inserted between the battery cathode 51 and the circuit cathode 22.

Figure 3:
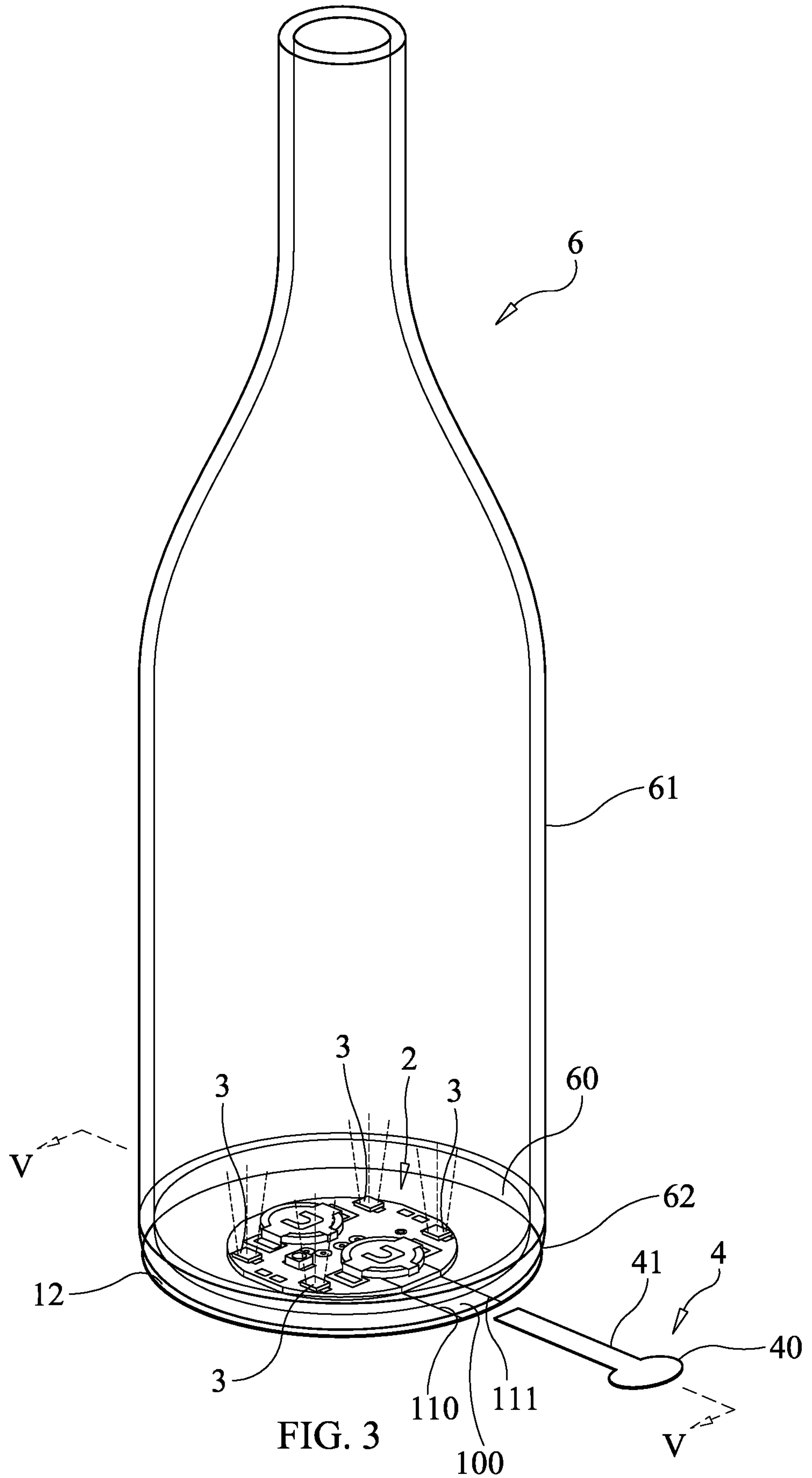
FIG. 3 is a top front right perspective view of an illuminated bottle assembly having the light assembly shown in FIG. 1 when attached to a bottom of a bottle.

FIG. 3 shows a bottle 6. The bottle 6 has a wall 61 and a bottle bottom 60. The bottle bottom 60 forms a punt of the bottle. A bottom edge 62 of the bottle 6 is defined where the wall 61 joins the bottle bottom 60. To adhere the light assembly 1 to the bottle 6, the liner 11 is peeled from the backing 10 to expose the adhesive 12. The adhesive 12 is pressed against the bottle bottom 60 of the bottle to dispose the circuit board 2 within the punt of the bottle. After adhering the light assembly 1 to the bottle 6, the insulator tab 4 is removed by pulling the grip 40 outwardly. After the insulator tab 4 is removed, the battery cathode 51 and circuit cathode 22 contact each other to complete the circuit with the LEDs 3, provided that the switch 7 is turned on.

FIG. 4 shows the light assembly 1 with the strip 41 disposed between the circuit cathode 22 and the battery cathode 51. While still inserted, the strip 41 prevents the battery cathode 51 from electrically connecting to the circuit cathode 22.

FIG. 5 shows the light assembly 1 adhered to the bottle 6 with the insulator tab 4 installed. The strip 41 is beneath the battery 5. The backing 10 is adhered to the bottle bottom 60.

FIG. 6 shows the light assembly. A backing 10 is circular. Adhesive 12 is disposed on the backing top 13 in a c-shape. A liner 11 is removable and covers the adhesive 12 until the adhesive is to be adhered to a bottle bottom. A circuit board 2 is adhered to the backing top 13. The circuit board top 20 supports circuit anodes 22. Batteries 5 are secured to the circuit board top 20. An insulator tab 4 with a grip 40 and strip 41 is disposed between one of the batteries 5 and its respective circuit cathode 22.

A preferred method for illuminating bottles includes the following steps. Obtaining a light assembly like one shown in FIGS. 1-6. The next is peeling the liner 11 from the backing 10 to expose the adhesive 12. Placing the light assembly 1 onto the bottle bottom 60 with the adhesive 12 facing the bottle bottom 60, so the circuit board 2 is centered on the bottle bottom 60 and the circuit board is nested with the punt of the bottle. Pressing the backing 10 against the bottle bottom 60 to contact the adhesive 12 to the bottom bottle.

In the next step, when it is time to illuminate the bottle, the method includes removing the insulator tab 4. To remove the insulator tab 4, the steps of pulling the insulator tab 4 outward by pulling on the grip 40.

In a first preferred embodiment of the method, the light assembly 1 is adhered to the bottle 6 during the manufacturing process, before delivering the bottle 6 to a retailer. The light can be attached by the bottle manufacturer, the bottler, or the distributor.

In a second preferred embodiment of the method, the light assembly 1 is adhered to the bottle 6 by a retailer. When the retailer wants to attract customers to the bottle 6, the retailer pulls the insulator tab 4 to active the LEDs 3. The retailer pulls the insulator tab 4 after a wholesaler delivers the bottle 6 to the retailer.

In a third preferred embodiment, a worker at a nightclub or bar pulls the insulator tab to active the LEDs when serving the bottle 6. The light assembly 1 can be attached to the bottle 6 at the nightclub or bar.

Alternatively, the light assembly 1 can arrive already attached to the bottle 6. In other words, a wholesaler or manufacturer adheres the light assembly 1 to the bottle 6 before delivering the bottle 6 and adhered light assembly 1 to the retailer. Subsequent to the delivery to the retailer, the retailer or purchaser pulls the insulator tab 4 before drinking contents of the bottle 6.

In a fourth preferred embodiment, an end consumer pulls the insulator tab 4. The consumer can attach the light assembly 1 to the bottle before pulling the insulator tab 4. Alternatively, the consumer can buy a bottle 6 with the light assembly 1 already attached to the bottle.

What is claimed is:

1. A light assembly for illuminating a bottle, comprising:

an electrical light for generating light, said electrical light having a light anode and a light cathode;

a backing having a backing perimeter and a backing top, said backing top supporting said electrical light;

a battery having a battery cathode and a battery anode, said battery being supported by said backing;

an anode battery contact for connecting to said battery anode;

a cathode battery contact for connecting to said battery cathode;

an anode lead interconnecting said anode battery contact and said light anode;

a cathode lead interconnecting said cathode battery contact and said light cathode;

an insulator tab being interposed between one of said battery cathode and said cathode battery contact, and said battery anode and said anode battery contact, said insulator tab having a strip width, said insulator tab being removable; and adhesive for adhering to a bottle bottom of the bottle, said adhesive being disposed on said backing top;

said backing having a skid pad running between said battery and said backing perimeter, said skid pad being free of said adhesive, said skid pad having a skid pad width greater than said strip width; and said insulator tab overlying said skid pad, extending beyond said backing perimeter, and remaining removable when said backing is adhered to the bottle.

2. An illuminated bottle assembly, comprising:

a bottle; and a light assembly according to claim 1 with said adhesive adhering said backing top to said bottle and said insulator tab being disposed between said skid pad and said bottle to allow sad insulator tab to be removable while said backing top is adhered to said bottle.

3. A light assembly for illuminating a bottle, comprising:

an electrical light for generating light;

a backing having a backing perimeter and a backing top, said backing top supporting said electrical light;

a battery being connected electrically to said electrical light to form a circuit, said battery providing electricity to illuminate said electrical light when said circuit is connected;

a break point in said circuit for interrupting and completing said circuit;

an insulator tab being inserted in said circuit at said break point, said insulator tab interrupting said circuit when being inserted at said break point, and said insulator tab allowing said circuit to be completed when said insulator tab is removed from said break point, said insulator tab having a strip width; and adhesive for adhering to a bottom of the bottle, said adhesive being disposed on said backing top;

said backing top having a skid pad running between said break point and said backing perimeter, said skid pad being free of said adhesive, said skid pad having a skid pad width greater than said strip width; and said insulator tab overlying said skid pad and being disposed between said skid pad and said bottle, extending beyond said backing perimeter, and remaining removable by outwardly pulling when said backing is adhered to the bottle.

4. The light assembly according to claim 3, wherein:

said break point includes a circuit electrode in said circuit;

said battery includes a battery electrode;

said break point includes said circuit electrode and said battery electrode; and said insulator tab is removably inserted between said circuit electrode and said battery electrode.

5. A method of lighting bottles, which comprises:

providing the light assembly according to claim 1;

adhering said light to a bottle with said insulator tab being disposed between said skid pad and said bottle; and after adhering said light to said bottle, pulling said insulator tab laterally to allow an electrical connection between said battery cathode and said cathode battery contact and between said battery anode and said anode battery contact.

6. The method according to claim 5, which further comprises:

adhering said electrical light to said bottle before delivering said bottle to a retailer; and pulling said insulator tab before delivering said bottle to the retailer.

7. The method according to claim 5, which further comprises:

adhering said electrical light to said bottle before delivering said bottle to a retailer; and pulling said insulator tab after delivering said bottle to the retailer.

8. The method according to claim 5, which further comprises:

adhering said electrical light to said bottle before delivering said bottle to a drinking establishment; and pulling said insulator tab before delivering said bottle to the drinking establishment.

9. The method according to claim 5, which further comprises:

adhering said electrical light to said bottle before delivering said bottle to a drinking establishment; and pulling said insulator tab after delivering said bottle to the drinking establishment.

10. The method according to claim 5, which further comprises:

adhering said electrical light to said bottle before drinking contents of said bottle; and pulling said insulator tab before drinking contents of said bottle.

11. The method according to claim 5, which further comprises:

adhering said electrical light to said bottle before drinking contents of said bottle; and pulling said insulator tab before selling said bottle.

* * * * *